United States Patent

Kohler

[15] 3,641,759
[45] Feb. 15, 1972

[54] SPINDLE BEARING ASSEMBLY
[72] Inventor: Gisbert Kohler, Stuttgart, Germany
[73] Assignee: SKF Kugellagerfabriken Gesellschaft mit beschrankter Haftung, Schweinfurt, Germany
[22] Filed: July 14, 1970
[21] Appl. No.: 54,777

[30] Foreign Application Priority Data

Aug. 16, 1969 Germany .......................P 19 41 866.7

[52] U.S. Cl. ...................................57/129, 57/135, 308/149
[51] Int. Cl. .........................................................D01h 7/08
[58] Field of Search .............................................57/129–135;
308/26, 149, 152; 242/46.2, 46.7

[56] References Cited

UNITED STATES PATENTS

| | | | |
|---|---|---|---|
| 2,304,370 | 12/1942 | Neal | 57/130 |
| 2,486,730 | 11/1949 | Berg | 57/135 |
| 2,663,138 | 12/1953 | Geen | 57/129 |
| 2,872,774 | 2/1959 | Fink | 57/129 |
| 3,049,860 | 8/1962 | Beerli | 57/135 |

*Primary Examiner*—John Petrakes
*Attorney*—Richard Low and Murray Schaffer

[57] ABSTRACT

A spindle bearing assembly wherein a bearing housing is mounted in the recess of a spindle rail. A helical spring is provided between the lower surface of the rail and the end of the housing to axially bias the housing. A laminar spring is interposed between the upper surface of the rail and the housing, the laminar spring having a greater radial resiliency than axial resiliency.

11 Claims, 2 Drawing Figures

PATENTED FEB 15 1972

Inventor:
GISBERT KOHLER 3,641,759

SPINDLE BEARING ASSEMBLY

BACKGROUND OF THE INVENTION

The present invention relates to yarn spinning and twisting machines, and in particular to apparatus for mounting spindle bearing housings on a spindle rail.

Conventional spinning and twisting machines operate simultaneous on a plurality of yarn rovings, each wound around individual spools. Each spool is mounted on a spindle shaft received in a bearing sleeve, located within a spindle bearing housing. The plurality of spindle bearing housings are themselves mounted in a group or bank on a spindle rail. In order to insure proper and efficient drawing of the roving, it is necessary to maintain the spindle shaft in fixed alignment with respect to the bearing sleeve and bearing housing. Achieving this end is difficult, since there exist variations and nonuniformity in the mass and density of rovings, which create non uniform axial and radial loads on the spindle shaft.

In order to improve the operation of the spindle, various expedients have been attempted. For example, the bearing sleeve receiving the spindle shaft has been arranged in the spindle bearing housing so that it can oscillate and move in all directions, relative to the axis of bearing housing. The bearing housing itself is also pivotally and radially movable in the spindle rail, and is mounted by means of resiliently yieldable intermediary members.

The movable installation of the spindle shaft, or of the bearing sleeve in the bearing housing, and the subsequent flexible mounting of the housing, permits the geometric axis of the spindle shaft to become self-adjustable automatically and without need for a more complicated mechanism. The self-adjustment is directly responsive to the rotation of the inert mass and imbalance of the wound spool, especially at a high rotational speed when the effective moment of inertia reaches a minimum relative to the axis of inertia. In other words, the degrees of freedom provided by the movable system make it possible for the spindle shaft to perform tilting movements about a point and to be shifted parallel to its geometric axis. By being superimposed on the spindle shaft, the spool and its mass can be thus stabilized. A bearing arrangement such as that described here is known from German Pat. No. 1,025,767.

In the bearing arrangement of the aforementioned patent, an elastically yieldable support member in the form of a thin disk or bushing located to one side of the spindle rail is provided to support the bearing housing, and a power accumulator or resilient biasing device, such as a hollow rubber pad, is provided on the other face of the spindle rail to tension the bearing housing. The design of the bearing assembly, according to the aforementioned patent, has been found to be disadvantageous and not as efficient as is desirable. The disadvantages arise from the difficulty in forming the disk and hollow pad in such a manner as to provide the suitable prestressing required to obtain the necessary radial as well as axial resiliency and adjustability to insure the precise response of the spindle shaft.

It is an object of the present invention to provide a spindle bearing housing, improving on and overcoming the disadvantages of the prior art.

It is an object of the present invention to provide a spindle bearing housing assembly which provides self-adjustment in an easy and efficient manner.

It is a particular object of the present invention to provide a spindle bearing assembly which has greater elasticity against radial forces than it has against axial forces.

It is also an object of the present invention to provide a spindle bearing assembly which is simple in design, easy to assembly and to use.

The enumerated objects as well as others, together with numerous advantages, will be apparent from the following disclosure.

SUMMARY OF INVENTION

According to the present invention, a spindle bearing assembly is provided for mounting a spindle on the spindle rail. The bearing assembly comprises a bearing housing axially arranged in a spaced recess of the rail. Spring means, preferably a helical spring, is provided to bias the housing in an axial direction, the spring being located between the lower face of the rail and the end of the housing. Interposed between the surface of the bearing housing and the upper surface of the rail is a laminar spring structure comprising at least an elastomeric body and a lower and upper cover plate of nonelastomeric material. The lower cover is connected to the spindle rail, while the upper cover is connected to the bearing housing. In this manner, the laminar spring permits greater resiliency in a radial direction than in an axial direction.

Preferably, the elastomeric material is provided with one or more nonresilient inserts sandwiched therein to stiffen the structure. Additionally, the structure is provided with either axial clamping means or the cover plates are integrally fixed to the elastomeric body to prevent relative movement between the plates and body.

It is also preferred that the helical spring be adjustably mounted so that its spring rate may be varied.

Various other preferences, as well as full details of the present invention, are set forth in the following description and in the accompanying drawings.

BRIEF DESCRIPTION OF DRAWINGS

In the following disclosure reference is made to the accompanying drawings in which.

DESCRIPTION OF INVENTION

Figure 1:
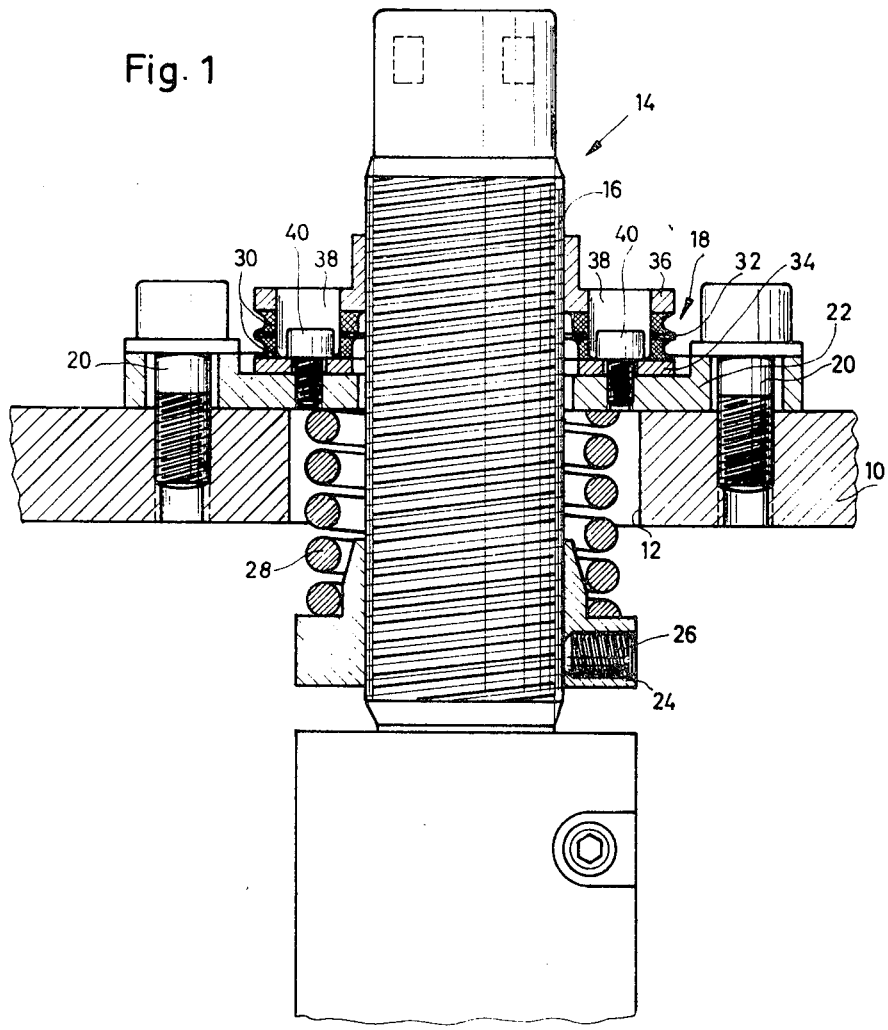
FIG. 1 is a longitudinal section of a spindle bearing apparatus made in accordance with the present invention.

In the drawings, only a portion of a spindle rail of a conventional yarn spinning or twisting machine is shown. To avoid duplicating the disclosure, and to maintain it as brief as possible, only one spindle bearing and mounting assembly is depicted, it being understood that the present device may be duplicated for as many spindles and assembly as necessary. Further, to maintain this specification as brief as possible, related spinning machine equipment, elements and components, have been omitted from the drawing and description. Those skilled in this art will easily be able to supply such information and details as are necessary by reference to conventional equipment now in use.

Turning now to FIG. 1, there is shown a horizontally arranged spindle rail 10, provided with a vertical recess or hole 12 in which is located a cylindrical spindle bearing housing, generally denoted by the numeral 14. The recess 12 in this embodiment is oversized so that its vertical walls are spaced a substantial distance from the surface of the spindle bearing housing 14, which is provided on its lower portion with external screw threads 16. A laminar spring 18, enveloping and holding the spindle bearing housing 14, sits on a mounting plate 22, which is releasably fastened to the upper surface of the spindle rail 10 by means of screws 20. The mounting plate 22 is preferably annular, and envelopes or surrounds the spindle bearing housing 14 with only a small radial clearance as compared with the clearance afforded by the spaced walls of the recess 12, so that it largely covers the recess. Threaded to the lower edge of the bearing housing 14 is a flanged sleeve 24 which is fixed against movement by a set screw 26. A helical compression spring 28 is located between the flange of sleeve 24 and the under surface of the mounting plate 22 passing through the recess 12. The spring 28 exerts an axial tensioning force or bias on the bearing housing, serving as a source of accumulated power acting to maintain the bearing housing 14 in vertical position with respect to the spindle rail 10. The spring rate of the helical screw is variable by adjustment of flange sleeve 24. The laminar spring 18, as will be more fully described later, acts to hold and maintain the bearing housing against both axial and radial deflection, which, as explained earlier, in the introduction, may be caused by various factors such as variations in the mass of the spindle or tension on the yarn.

The laminar spring 18, according to the present invention, is intended to have a greater elasticity or resiliency in the radial direction than in the axial direction. The laminar spring 18 comprises a pair of yieldable annular bodies 30, made of elastomeric material, such as rubber or synthetic rubber, between which is located a metallic or other hardened insert 32. Preferably, the insert 32 and the bodies 30 are joined or fixedly connected by adhesive or other means, such as vulcanization, to form a unitary subassembly. The insert 32 stiffens the elastically of the laminar spring against deflection and deformation in the axial direction and is therefore chosen of the desired material and size to obtain a predetermined effect. If desired, several superimposed inserts may be employed to further stiffen the spring.

The resilient body members 30 are sandwiched between a lower covering plate 34 and an upper covering plate 36. The covering plates 34 and 36 are formed of a material less resilient than the elastomeric material of the resilient body members 30. The upper cover plate 36 has a tubular sleevelike central portion which engages the external threads 16 of the housing 14, to which it may be fixed by a set screw (not shown) or by deformation of the threads, to prevent rotation. The axial compression created by securing the upper cover plate to the housing acts to maintain the interfaces between the plate and elastic bodies in close abutment and prevents relative rotation and creation of harmful functional effects.

The laminar spring assembly 18 is provided with a plurality of axial bores 38, spaced uniformly about its center. The portions of the bore passing through the upper cover plate 36 and the bodies 30 are of greater diameter than the bore portion passing through the lower cover plate 34. A screw 40 passes through the bore 38 and is received within a threaded hole in the mounting plate 22. The head of each screw 40 abuts against the lower cover plate 36 and thereby secures to entire laminar spring to mounting plate. At this point, it will be obvious that, if desired, the mounting plate 22 and the lower cover plate 34 can be of one piece, or unitarily formed rather than the two pieces shown.

The laminar construction of the spring 18, in which the resilient bodies 30 are separated by at least one stiffening insert 32, provides a greatly enhanced resilient holding device for the bearing housing and has a greater spring constant in one direction than in another. Axial loads, upward or downward, are absorbed easily and effectively by the resilient bodies within their limits of compression and stretch. The laminar spring 18 also reacts easily and effectively to forces which are nonaxial but are in an angular or deflecting direction, as may be caused by variation in spindle mass or tension on the yarn. Normally, such force would tend to deflect or deform a housing holding device, but because of the provision of contiguous interfaces or border zones formed by the insert 32, and the cover plates 34 and 36, with the elastomeric bodies, 30 restoration of the laminar spring 18 and housing 14 is quickly and efficiently accomplished. Deformation of the laminar spring caused by deflection of the bearing housing from the vertical is averted and virtually eliminated as a result of the stiffening nature of both the inserts and the cover plates. Forces acting in the radial direction are, on the other hand, resiliently absorbed by the bodies 30, which move or shear along a plane parallel to the spindle rail 10.

In combination, the reaction of the laminar spring 18 to those forces resulting from the rotation of a spindle on the bearing, at even high speeds, is effective to modify the deflection and resiliently maintain the housing and the spindle mounted thereon in proper operating condition. This constriction reduces to almost a nil any deformation of the bearing housing, its mounting assembly, the spindle or spindle rail. Excessive vibration and noise are also eliminated.

Figure 2:
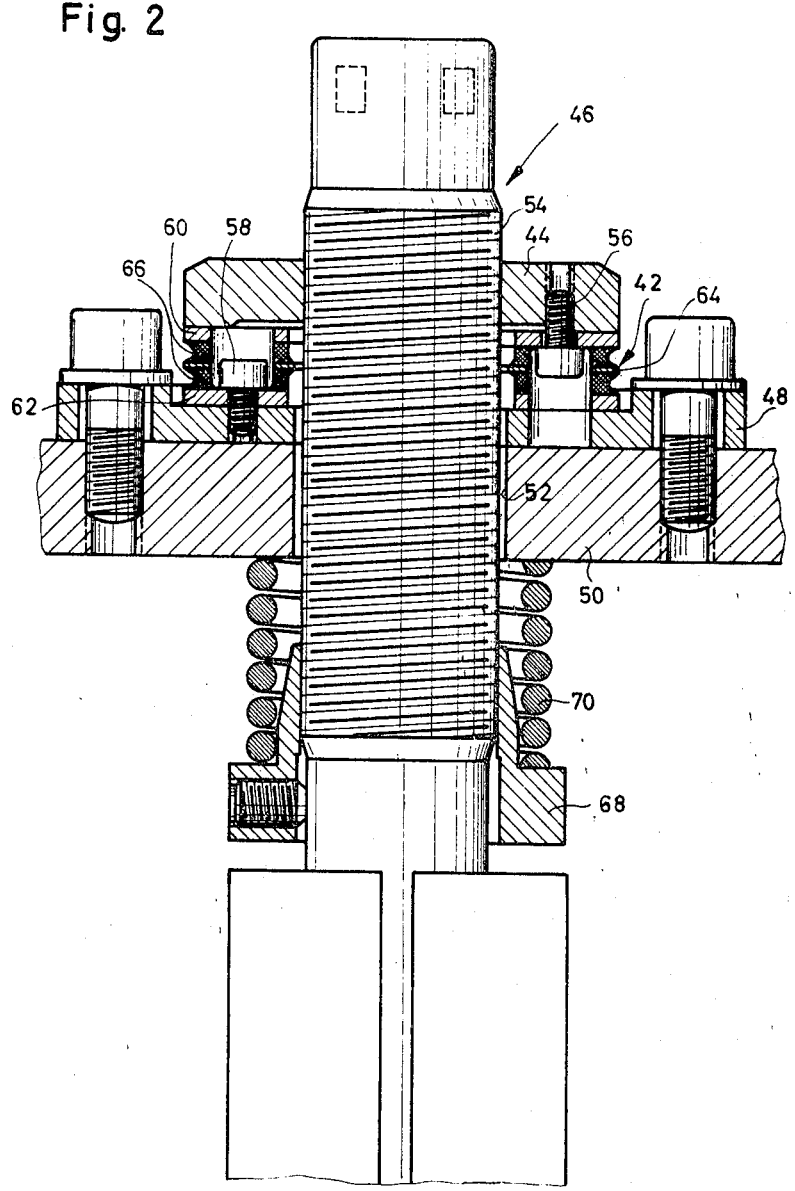
FIG. 2 is a view similar to that of FIG. 1 showing a modified bearing apparatus.

In the embodiment illustrated in FIG. 2, a similar construction is shown with a number of variations on the mounting of the laminar spring and the power accumulator spring. As seen, a laminar spring 42 is located between an annular plate 44 which is threadedly connected like a nut to a spindle bearing housing 46 and an annular mounting plate 48, which is releasably secured to a spindle rail 50 by a plurality of screws or bolts. The spindle rail 50 is provided with an axial hole 52 which has a much smaller diameter than the hole 12 shown in FIG. 1 and in fact is coextensive with the central hole in the annular mounting plate 48. The hole 52 provides a radial clearance about the exterior of the mounting 46, sufficient only to permit the desired deflection of the housing. The laminar spring assembly 42 is secured to both the flange 44 and the mounting plate 48 by screw fastener 56 and 58 respectively.

The laminar spring assembly 42 is similar in structure to that shown in FIG. 1, It comprises an annular cover plate 60, a lower cover plate 62, a central stiffening insert 64, and a pair of resilient disklike bodies 66. In this construction, it may be desirable to adhere or vulcanize the cover plates 60 & 62 to the elastomeric bodies to form an even large subassembly. This is permitted because the cover plate 60 is not secured to the bearing housing but in this function is superseded by the flange nut 44. A plurality of radially arranged axial holes are also provided; however, here the direction of the smaller diameter portion of the holes are alternated in opposite directions so that the screw fasteners 56 and 58 may be uniformly placed to secure the laminar spring assembly to both the flange 44 and mounting plate 48.

A flange sleeve 68 is adjustably mounted about the lower most end of the housing 46 and is only partially threaded on its external threads. It is, however, maintained against rotation relative to the housing by the similar use of set screw means. A power accumulator spring 70 is located between the flange of sleeve 68 and the underside of the spindle rail 50, the hole of which having to be narrowed for just this purpose.

In operation, the embodiment shown in FIG. 2 functions in the same manner as that shown and described in connection with FIG. 1 and its description need not be repeated here except to emphasize that the laminar spring assembly 42 is also more resilient to radial forces and is not deformed or permanently deflected by axial forces.

The structure shown in FIG. 2 has a decided advantage over that shown in FIG. 1, in that the laminar spring assembly 42, the mounting plate 48, and the upper flange nut 44 comprise a desirable unitary assembly which may be preassembled and installed as a unit, the screws holding the mounting plate to the spindle rail being the only elements which need to be removed to disassemble this unit from the entire structure. In this manner, the unit may be removed without need to remove the power accumulator spring 70.

Various other arrangements or modifications may be made. The insert 32 or 64 may be radially coextensive with the bodies 30 and 66, or it may be smaller and so embedded within a unitary molded body. The laminar spring assembly may be made of three or more stacks or layers of elastomeric bodies and/or inserts, although ordinarily only one body is minimally necessary. As noted, the cover plates may be modified as desired.

Further, the embodiments shown in FIG. 1 and 2 may be combined. That is, the laminar assembly 14 of FIG. 1 may be used on the spindle rail and power accumulator spring of FIG. 2, while the laminar assembly 42 of FIG. 2 may be used in the device of FIG. 1.

The spindle bearing housing may be supported by a plurality of rectangular laminar assemblies, extending spokelike from the housing rather than an annular assembly provided, of course, that uniform consistent elastomeric support is provided completely about the housing.

The arrangement of this invention makes it possible to move the spindle bearing housing in the required manner; that is, in the various directions in which the spindle sleeve cannot normally be shifted. Thus, by having the housing respond to and react to centrifugal forces created by uneven mass and yarn tension, the spindle sleeve and the spindle itself may be maintained in perfect adjustment about the spindle axis so that free rotation of the spindle is maintained. This is, of course, obtained by providing a holding spring which has greater elasticity and resiliency in the radial direction than in the axial direction. The rigidity in the axial direction is furthermore variable by the insertion of stronger or more stiffening inserts or the provision of stronger covering plates. However, even though stronger inserts may be provided, the spring constant or characteristic in the radial direction remains unchanged. In effect, the laminar construction described constitutes a floating system which is highly responsive to radial forces, but which, because of the sheer stress of the material, enhances the deflection of the spindle bearing housing.

Since various modifications and changes have been suggested herein, it is intended that this disclosure be taken as illustrative only of the present invention and not limiting thereof.

What is claimed is:

1. A spindle bearing assembly comprising a bearing housing adapted to receive a spindle axially therein, a spindle rail having a recess for axially receiving said bearing housing, spring means for biasing said bearing housing in a substantially axial direction with respect to said spindle rail, resilient means interposed between said bearing housing and the upper side of said spindle rail, said interposed resilient means comprising a laminar structure having a body of elastomeric material, a lower cover plate and an upper cover plate for said laminar structure and being of material less resilient than the elastomeric material, and means securing said lower cover plate and said upper plate to said spindle rail and said bearing housing respectively to thereby permit a greater resiliency radially said bearing housing than axially thereof.

2. The assembly according to claim 1, wherein said elastomeric body is provided with at least one insert located centrally of said elastomeric body and of material less resilient than the elastomeric material.

3. The assembly according to claim 1 wherein said interposed resilient means comprises a plurality of stacked laminar structures.

4. The assembly according to claim 1, wherein said cover plates are integrally fixed with the surfaces of said elastomeric body.

5. The assembly according to claim 1 wherein said laminar structure is annular and surrounds said bearing housing.

6. The assembly according to claim 5, wherein said upper cover plate is provided with fastening means secured to said bearing housing.

7. The assembly according to claim 6, wherein said fastening means comprise a sleeve mounted about said bearing housing, said bearing housing and said sleeve having interengaging screw threads.

8. The assembly according to claim 5, further including an annular base plate removably mounted to said spindle rail and wherein said lower cover plate is fixedly mounted to said annular base plate.

9. The assembly according to claim 1, further including a radial flange secured to the end of said bearing housing and wherein the axial spring means comprises a helical spring surrounding said bearing housing, said spring abutting at one end against the lower surface of said spindle rail and at its other end against said radial flange.

10. The assembly according to claim 9, wherein said radial flange is adjustably secured to said bearing housing to thereby permit the spring rate of said helical spring to be varied.

11. The assembly according to claim 1, wherein the recess in said spindle rail is spaced from said bearing housing and said helical spring passes through said recess and abuts against the lower cover plate.

* * * * *